(12) United States Patent
Roberts (10) Patent No.: US 6,252,692 B1
(45) Date of Patent: Jun. 26, 2001

(54) OPTICAL FIBRE TRANSMISSION SYSTEMS

(75) Inventor: Kim Byron Roberts, Welwyn Garden (GB)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/660,565

(22) Filed: Jun. 7, 1996

(51) Int. Cl.[7] .................................................. H04B 10/18
(52) U.S. Cl. ............................ 359/173; 359/110; 359/161
(58) Field of Search .................................... 359/161, 187, 359/179, 110, 173, 124, 132, 133, 194, 188, 195

(56) References Cited

U.S. PATENT DOCUMENTS

| | | | |
|---|---|---|---|
| 4,705,397 | * | 11/1987 | Tsuchiya et al. .................... 356/345 |
| 4,710,022 | * | 12/1987 | Soeda et al. ......................... 356/73.1 |
| 4,750,833 | * | 6/1988 | Jones .................................... 356/73.1 |
| 4,799,789 | * | 1/1989 | Tsukamoto et al. ................ 356/73.1 |
| 5,033,846 | * | 7/1991 | Hernday et al. ..................... 356/73.1 |
| 5,179,420 | * | 1/1993 | So et al. .............................. 356/73.1 |
| 5,289,550 | * | 2/1994 | Plastow ................................. 359/187 |
| 5,400,165 | * | 3/1995 | Gnauck et al. ....................... 319/161 |
| 5,406,368 | * | 4/1995 | Horiuchi et al. .................... 356/73.1 |
| 5,513,029 | * | 4/1996 | Roberts ................................. 350/177 |
| 5,608,562 | * | 3/1997 | Delavaux et al. .................... 359/161 |
| 5,612,807 | * | 3/1997 | Ishikawa et al. ..................... 359/161 |
| 5,675,429 | * | 10/1997 | Henmi et al. ......................... 359/179 |
| 5,717,510 | * | 2/1998 | Ishikawa et al. ..................... 359/161 |
| 5,726,789 | * | 3/1998 | Horiuchi et al. ..................... 359/184 |
| 5,737,109 | * | 4/1998 | Goodwin .............................. 359/161 |
| 5,745,275 | * | 4/1998 | Giles et al. ........................... 359/187 |
| 5,943,151 | * | 8/1999 | Grasso et al. ........................ 359/161 |

FOREIGN PATENT DOCUMENTS 0 140 853    5/1985  (EP).

* cited by examiner

*Primary Examiner*—Leslie Pascal
(74) *Attorney, Agent, or Firm*—Lee, Mann, Smith, McWilliams, Sweeney & Ohlson (57) ABSTRACT

An optical transmission system includes means for measuring optical dispersion in the optical path, and a controllable element such as a dispersion compensator, operable in dependence on the measured value of dispersion. A low frequency dither on the optical signal causes timing jitter which varies according to the dispersion in the optical path. The timing jitter is extracted from a clock signal recovered from the optical signal. This jitter is correlated with the original dither to remove jitter effects caused by other mechanisms. Thus a value for dispersion is derived which can be used for monitoring or control purposes.

34 Claims, 11 Drawing Sheets

OPTICAL FIBRE TRANSMISSION SYSTEMS

FIELD OF THE INVENTION

This invention relates to optical transmission systems, to control systems for optical transmission systems, to dispersion measurement systems, and to elements for receiving or processing signals in optical transmission systems, and to methods of transmitting data along an optical path.

BACKGROUND OF THE INVENTION

The distance between optical terminals of optical fibre transmission systems is limited by the optical power that can be launched into optical fibre by optical transmitters of the optical terminals, the loss and dispersion of optical fibre interconnecting the optical terminals, and the sensitivity of optical receivers of the optical terminals. Where the distance between desired end points of an optical fibre transmission system exceeds the maximum distance between optical terminals, optoelectronic repeaters have been provided. Each optoelectronic repeater comprises an optical receiver for converting the optical signal to an electrical signal, electronics for regenerating the electrical signal, and an optical transmitter for converting the regenerated electrical signal to an optical signal for transmission to the next optoelectronic repeater or to a terminal of the system. There are two main techniques for multiplexing signals in such systems, which operate by wavelength division or time division.

In Wavelength Division Multiplexed (WDM) optical fibre transmission systems which use optoelectronic repeaters, the optical signals are optically demultiplexed at each repeater, so that the signal at each distinct wavelength is coupled to a respective optical receiver for conversion to a respective electrical signal, each respective signal is applied to a respective optical transmitter operating at a distinct wavelength, and the transmitted signals are optically multiplexed for transmission to the next optoelectronic repeater or to a terminal of the system.

As the line rates of optical fibre transmission systems increase into the 2.5 Gbps to 10 Gbps range, higher speed electronics are needed in optoelectronic repeaters, and this increases the cost of optoelectronic repeaters.

Optical amplifiers, for example Erbium Doped Fibre Amplifiers (EDFAs), amplify optical signals directly without converting them to electrical signals. Because EDFAs do not require high speed regeneration electronics, they can be cheaper than optoelectronic repeaters for high speed optical fibre transmission systems.

Moreover, in WDM optical fibre transmission systems, the EDFAs can amplify optical signals at multiple wavelengths without optically demultiplexing them, thereby avoiding the costs of optical multiplexing and demultiplexing, and the costs of multiple optical receivers, multiple regeneration circuits and multiple optical transmitters. Consequently, EDFAs can also be cheaper than optoelectronic repeaters for WDM systems. However, degradation by noise and dispersion effects builds up when optical amplifiers are used. Thus a regenerator may be necessary after several optical amplifier stages, to rebuild the data signal and remove the noise and dispersion degradation.

Disregarding intermodal dispersion which only occurs in multimode fibre (not used in practice for high capacity systems), dispersion, also known as Group Velocity Dispersion, in fibre at least, occurs as a result of two mechanisms:

1 intramodal dispersion—within a single mode different frequencies travel along the fibre at different speeds;
2 material dispersion—the phase velocity of plane waves in glass varies with frequency.

Dispersion is the derivative of the time delay of the optical path with respect to wavelength. The effect of dispersion is measured in picoseconds arrival time spread per nanometer 'line width' per kilometer length (ps $nm^{-1}$ $km^{-1}$). The magnitude of intramodal and material dispersions both vary with wavelength, and at some frequencies the two effects act in opposite senses. It is generally possible, on a given single mode fibre, to find a wavelength around which there is negligible dispersion, or, conversely, to design a fibre to have minimum dispersion at a desired wavelength. References to dispersion herein will mean the sum total of group velocity dispersion effects.

Dispersion in optical fibre presents serious problems when using light sources whose spectrum is non-ideal for example broad or multispectral-line, or when high data rates are required, e.g. over 2 GB/s. This problem has previously been addressed, at least partially, in four ways. Firstly, by operating at or close to the optical frequency at which the dispersion is a minimum, for example at a wavelength of 1.3 micron in conventional silica fibre. The frequency does not generally correspond with the frequency of minimum transmission loss and attempts to modify the fibre to shift its frequency of minimum dispersion usually result in some loss penalty. This solution has limitations for two reason. Firstly manufacturing variations will always occur. Secondly, a non linearity called four wave mixing seriously degrades WDM signals near the dispersion zero of one piece of fibre. Accordingly, it may be preferable to operate in a given region of dispersion which may not include the dispersion zero.

The second way of overcoming the problem is to use a source with a near ideal narrow linewidth spectrum. The limits for improvement in this respect have been reached since at higher bit rates, the Kerr effect becomes significant. This is where the index of refraction varies with intensity, which causes self phase modulation, or cross phase modulation. The resulting frequency redistribution means that dispersive degradation increases again.

Thirdly, dispersion compensators have been used to equalise the dispersion with an element of equal and opposite dispersion. Such dispersion compensators may take the form of length of fibre, a Mach Zehnder interferometer, an optical resonator, or a Bragg reflector. Some of these compensators can give a variable, controllable amount of compensation.

A fourth technique is to change the modulation at the transmitting end. On example is discussed in EP-A-0643 497. Dispersion produces an FM to AM conversion effect which can facilitate bit detection and thereby extend transmission distance without controlling or compensating dispersion. The dispersion causes shifting of adjacent signal components of different wavelengths, resulting in either energy voids or energy overlaps at the bit transitions. Constructive interference in an overlap causes a positive peak in the optical signal, while a void produces a negative peak. These positive and negative peaks represent an AM signal which may be detected to reproduce the original bit stream.

The document proposes the additional step of adjusting the output power of one or more of the inline amplifiers to further stabilise the dispersion-induced optical signal energy voids and overlaps and thereby further improve the detection thereof. This method requires difficult precision engineering and so is impractical for commercial exploitation.

With the different types of dispersion-shifted fibre, dispersion compensating fibre, and dispersion-compensating filters that could make up a given link, determining the dispersion of a link is no longer the simple operation of multiplying the length in km by the 17 ps/nm/km dispersion characteristic of standard single mode fibre. Moreover, when there are optical switches or controllable optical dispersion compensators in the link the dispersion can change as a function of time.

There are several laboratory test instruments available that measure this dispersion, on a static basis. However, they are large, expensive and cannot be used while a signal is present at the same wavelength. Some such instruments require both ends of the fibre be at the same location, and so can only be used to test components of a system before installation. Certainly they are not suitable for incorporation into any element of a practical transmission system.

Figure 1:
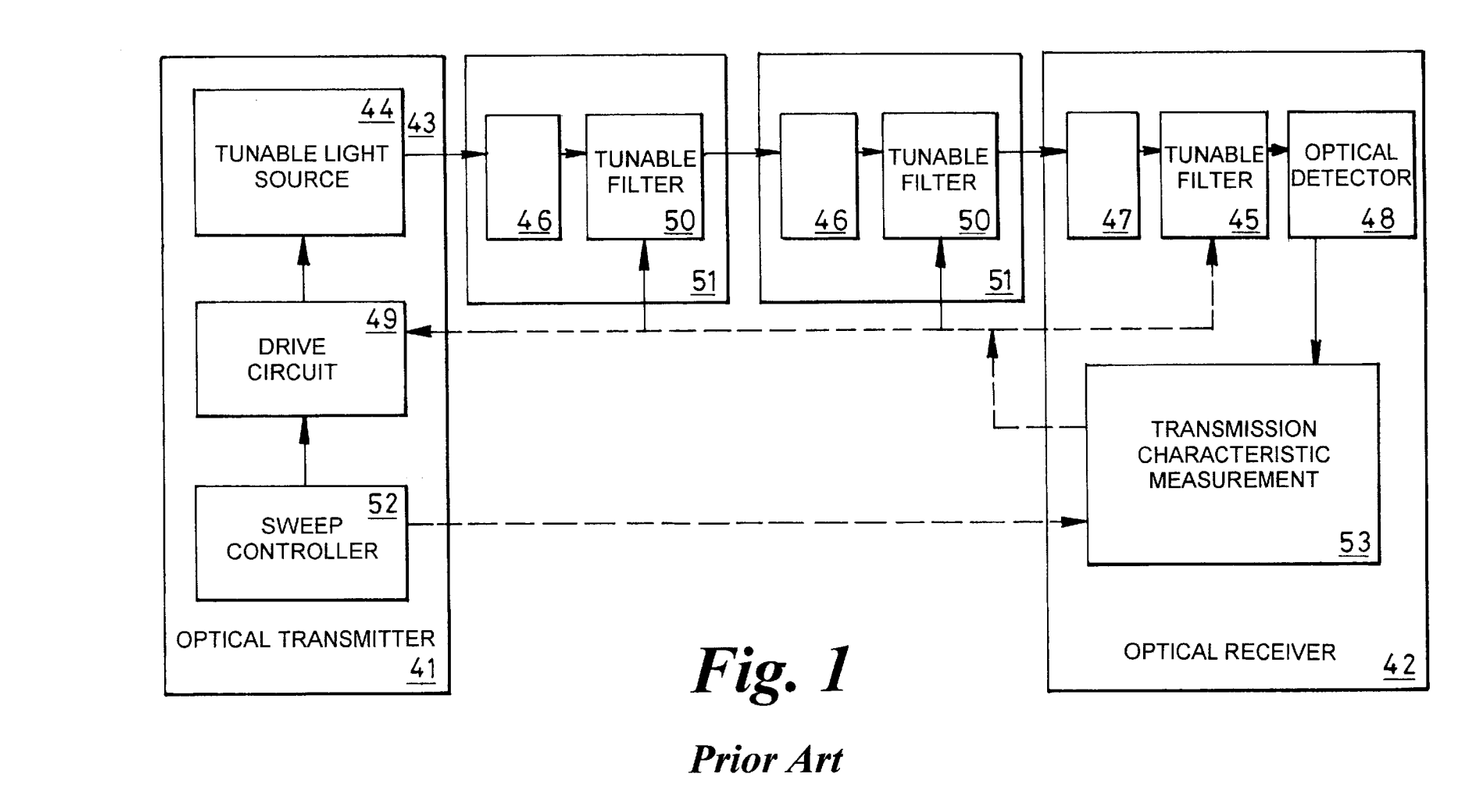
FIG. 1 shows a particular prior art transmission system showing an attempt to control the effects of dispersion.

One attempt to control the effects of dispersion in a high speed transmission system is known from EP-A-0700 178, as shown in FIG. 1. Reference numeral 41 is an optical transmitter, 42 is an optical receiver, 43 is an optical fibre, 44 is a tuneable light source, 45 is a tuneable filter, 46 and 47 are optical amplifiers, 48 is an optical detector, 49 is a drive circuit, 50 is a tuneable filter, 51 is a repeater, 52 is a sweep controller, and 53 is a transmission characteristic measuring section.

The drive circuit 49 is controlled by the sweep controller 52 to sweep the emission wavelength of the tuneable light source 44. For example, when the tuneable light source 44 is constructed from the tuneable semiconductor laser, sweeping can be accomplished by varying the currents Ip and Id; in the case of a semiconductor laser of other configuration, sweeping of the emission wavelength can be accomplished by continuously varying the temperature. The optical signal with the thus swept emission wavelength is transmitted along the optical fibre 43 and via the repeaters 51, and is detected by the optical detector 48 of the optical receiver 42, where the received result is applied to the transmission characteristic measuring section 53 which measures the transmission characteristic between the optical transmitter 11 and the optical receiver 12. Based on the result of the transmission characteristic measurement, the emission wavelength of the tuneable light source 44 and the wavelength transmission characteristics of the tuneable filters 45 and 50 are so set as to achieve the best transmission characteristic.

Variable dispersion compensators (not shown) may also be controlled to find an optimum measured transmission characteristic.

The transmission characteristic measuring section 53 may be constructed to measure the transmission characteristic by measuring bit error rates (BER). Alternatively, it may be contructed to measure the transmission characteristic using an eye pattern.

Since the eye pattern opens wide when the transmission characteristic is good, the emission wavelength of the tuneable light source 44 may be adjusted so that the eye pattern opens widest. As an adjusting means in this case, control may be performed manually while observing the eye pattern, or alternatively, automatic control by means of computer processing may be employed.

An alternative way of measuring the bit-error rate is to measure the Q value (electrical SNR). The Q value is expressed using the signal level difference (=signal amplitude) between emission and no emission as the numerator and the sum of the standard deviations of noise during emission and during no emission as the denominator. When a Gaussian distribution is assumed for the noise distribution, the bit-error rate given by the Q value agrees with the minimum-value of the actually measured bit-error rate. Other methods, such as measuring the transmitted waveform and using specifications of equal bit-error rate curves, may also be employed.

However, such measurements of transmission characteristics do not give a direct measurement of dispersion, since many other factors affect the bit error rate, the eye pattern and the Q value. There is no straightforward way of eliminating the effects of these factors. Therefore, accurate values of dispersion cannot be derived by these methods outside a laboratory.

A second problem with this system is that the sweeping technique causes a degraded BER, (a figure of $10^{-11}$ is quoted). This would be unacceptable in many working systems.

SUMMARY OF THE INVENTION

The present invention seeks to improve on such techniques.

According to one aspect of the invention, there is provided an optical transmission system for transmitting data along an optical path, the transmission system comprising: a controllable element; means for determining the optical dispersion of at least part of the optical path; and means for controlling the element in the transmission system in dependence on the determined optical dispersion value.

Measuring the dispersion directly enables better control of dispersion compensators, or other system elements, or improved monitoring and fault isolation. Measuring the dispersion rather than resulting degradation on the eye and BER enables a margin of performance of the optical path to be assessed under realistic zero error conditions. A further advantage arises because the optical path is often provided by a different supplier to the transmission equipment. This means it can be crucial to distinguish degradation caused by dispersion in the optical path from that caused by other optical problems or other parts of the transmission equipment.

According to another aspect of the invention there is provided a control system for a controllable element of an optical transmission system, comprising means for determining the optical dispersion of at least a part of an optical path of the transmission system , and means for controlling the controllable element of the optical transmission system wherein the control is operable in dependence on the determined optical dispersion value.

According to another aspect of the invention, there is provided a dispersion measurement system for measuring the optical dispersion of at least part of the optical path of an optical transmission system, the measurement system comprising at least a portion of an element of the transmission system for receiving or processing a signal passed along the optical path.

Intergrating portions of the dispersion measurement means with portions of existing elements in the transmission system enables a reduction in the total amount of hardware required. Furthermore, it enables measurements under realistic operating conditions, at the operating wavelengths, while data traffic is present, which is particularly important where variable dispersion elements are present.

A preferred feature involves the dispersion value being used to control dispersion compensating means or transmitters in the transmission system. This enables better control of such system elements, and easier design of control algorithms using linear control, than the case where values used to control elements are dependent on numerous system parameters.

Another preferred feature provides a monitoring means for comparing the optical dispersion value to a threshold. This enables dispersion problems to be flagged and isolated easily, to facilitate adjustment of variable compensators, or repair or replacement, by less skilled staff, either when commissioning or operating the transmission system. This has not been possible up to now. Where the threshold is exceeded measures may be taken to alter the data traffic, to avoid or reduce bit errors.

Centralised fault monitoring, or control of the transmission system can be facilitated by sending the measured value to a remote monitoring location. This can reduce costs. Another preferred feature involves measuring the timing jitter in the signal. This method is advantageous as it can be accurately measured, and is linearly related to dispersion, as it results from variation in transmitted wavelength.

Preferably the timing jitter is derived from a clock recovered from the received signal. This takes advantage of equipment already provided in the receiver, thus saving costs.

Preferably the jitter is derived from the phase difference between the recovered clock and the output of a phase locked loop locked to the recovered clock. This takes advantage of circuitry already provided in the receiver and the regenerator, thus saves costs, which is particularly significant for high speed circuitry.

The phase locked loop which is already used to provide a clock for a regenerator is preferred over the loop in the clock recovery circuit, because the regenerator loop may already be provided with filtering which passes only low frequencies. This means it will not respond to jitter above such frequencies. Thus such jitter will appear as a phase difference, and thus can be separated from the clock signal.

Preferably the measuring system also comprises a means for applying a variation in wavelength in the form of a predetermined pattern, to the signal before it passes along the part of the optical path to be measured. This enables easier extraction of the resulting timing jitter from the received signal, and thus more accurate measurement.

Preferably the wavelength variation is also used for monitoring or altering other parameters of the transmission system. Dual use saves costs, enables the dispersion measurement function to be retrofitted to existing systems, and minimises interference such as beating, which may be caused by added wavelength variations.

Preferably the wavelength variation is a low frequency dither signal for suppressing stimulated Brillouin scattering. Such variation may already be used in a transmission system particularly a high speed system, and can conveniently be reused for measuring dispersion.

Preferably a correlation is carried out between the measured timing jitter and the predetermined pattern. This enables more accurate measurement.

Preferably the pattern is asymmetric and the sign of the dispersion can be determined. This enables more information about the dispersion to be obtained, which is useful in particular in determining which way to adjust a variable compensator, to reduce the dispersion.

Preferably the dither pattern is pseudo random. This can minimise any interference the pattern may cause to the data traffic, or to other elements in the system.

Clearly, these preferred features can be combined in any appropriate way, in any aspect of the invention.

Another aspect of the invention provides an element for receiving, or processing a signal in an optical transmission system, comprising means for detecting jitter in the signal after transmission and means for correlating the detected jitter with a pattern in the transmitted signal. According to this aspect of the invention, the extracted and correlated timing jitter can be used for other purposes such as monitoring aspect other than optical dispersion, such as receiver induced jitter.

Another aspect of the invention provides an optical dispersion measurement system for measuring the optical dispersion in part of an optical transmission system while data traffic is present on that part of the transmission system. This enables measurements to be taken under realistic operating conditions.

Another aspect of the invention provides an optical dispersion measurement system for measuring the optical dispersion in at least part of an optical path in an optical transmission system, comprising means for detecting jitter in a signal after transmission, and means for correlating the detected jitter with a pattern in the transmitted signal.

Another aspect of the invention provides a method of transmitting data along an optical path in an optical transmission system, comprising the step of determining the optical dispersion in at least part of the optical path, and the step using the determined value for monitoring whether it exceeds a threshold or for controlling data flow, or for controlling a dispersion compensating device or method.

The invention will now be described by way of example, and to show how the same may be put into effect, with reference to the figures.

DETAILED DESCRIPTION

Figure 2:
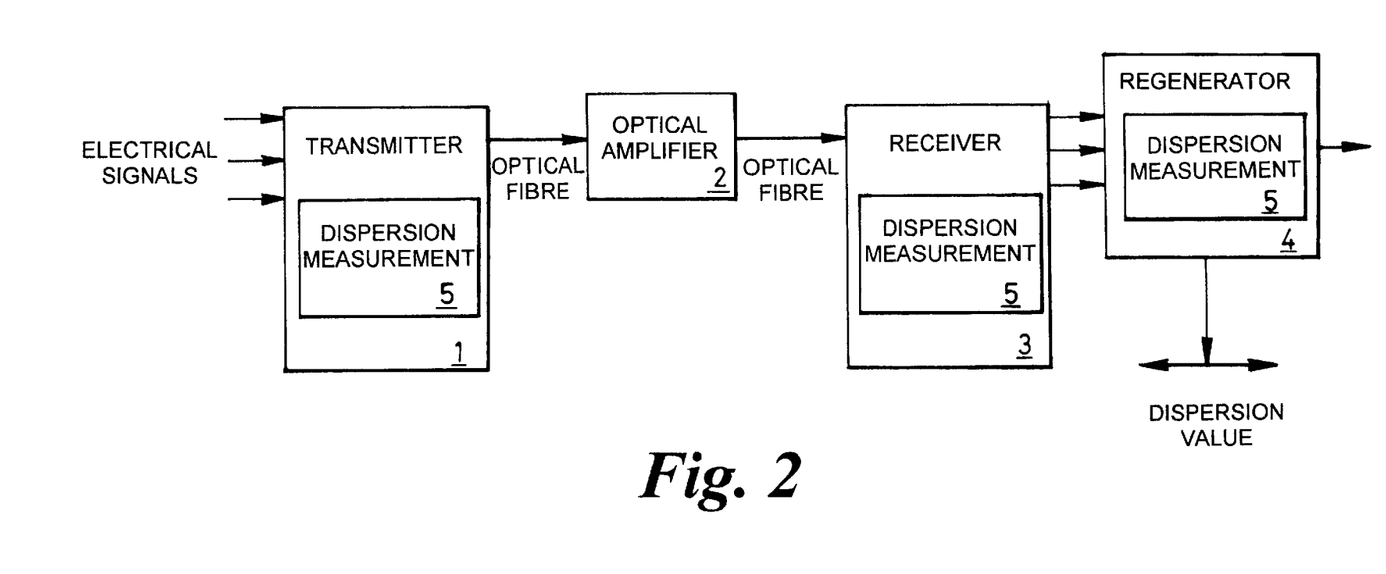
FIG. 2 shows a transmission system according to the invention.

FIG. 2 shows elements of an optical transmission system, comprising a transmitter (1) optical amplifier (2), receiver (3), regenerator (4) and elements of a dispersion measurement system (5) incorporated in the transmitter the regenerator and the receiver.

Electrical signals are multiplexed and converted into optical form for transmission along optical fibre. One or more optical amplifier stages may be necessary before the receiver is reached.

The regenerator may process electrical signals received from the receiver for further transmission optically, or for use in electrical form.

Here, the term regenerator covers variants with electrical demultiplexing functions, such as a terminal or an add/drop multiplexer (mux).

The dispersion measurement means may be separate from, or incorporated into the receiver or the amplifier or any other element in the transmission path.

Figure 7:
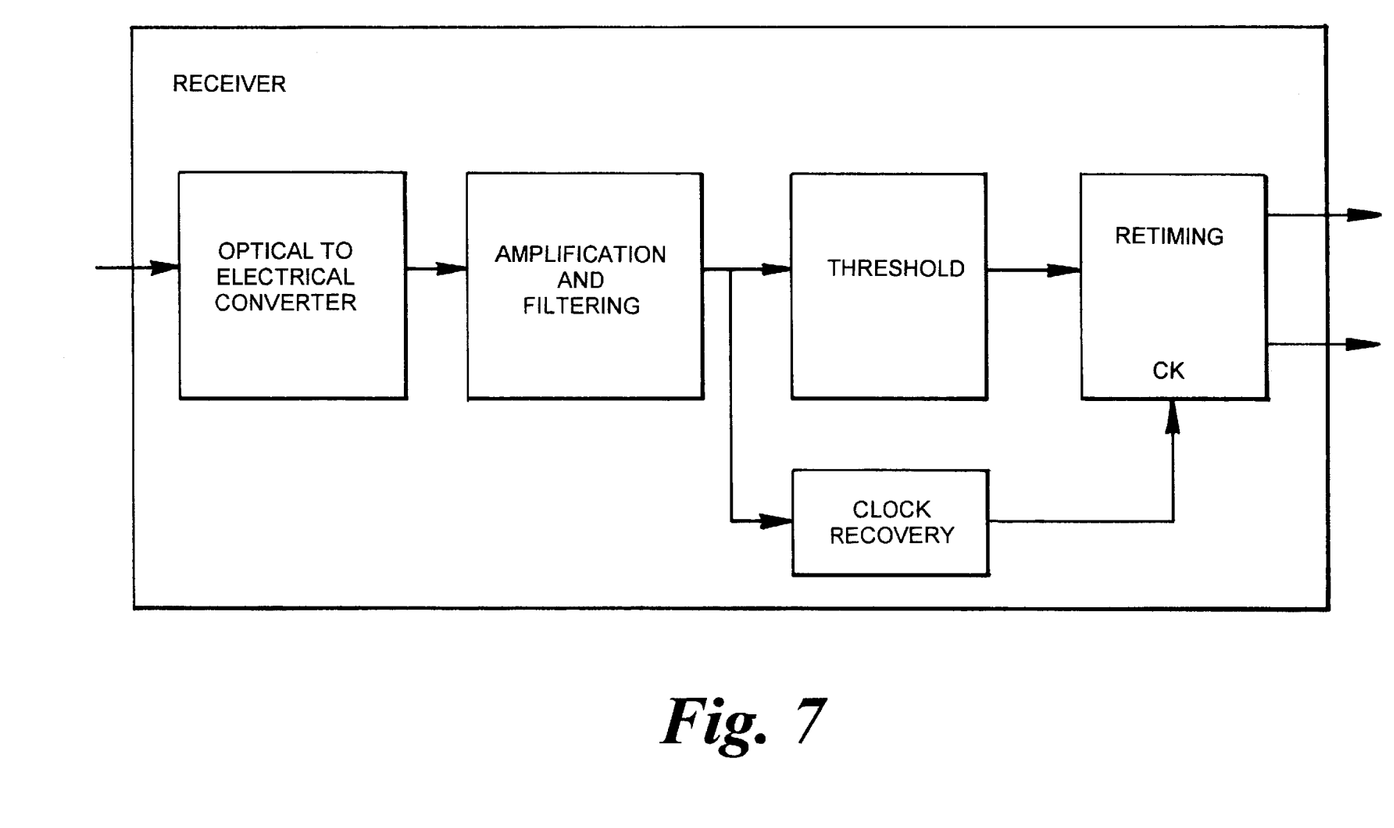
FIG. 7 shows a schematic diagram of a receiver for use in the system of FIG. 2.
Figure 8:
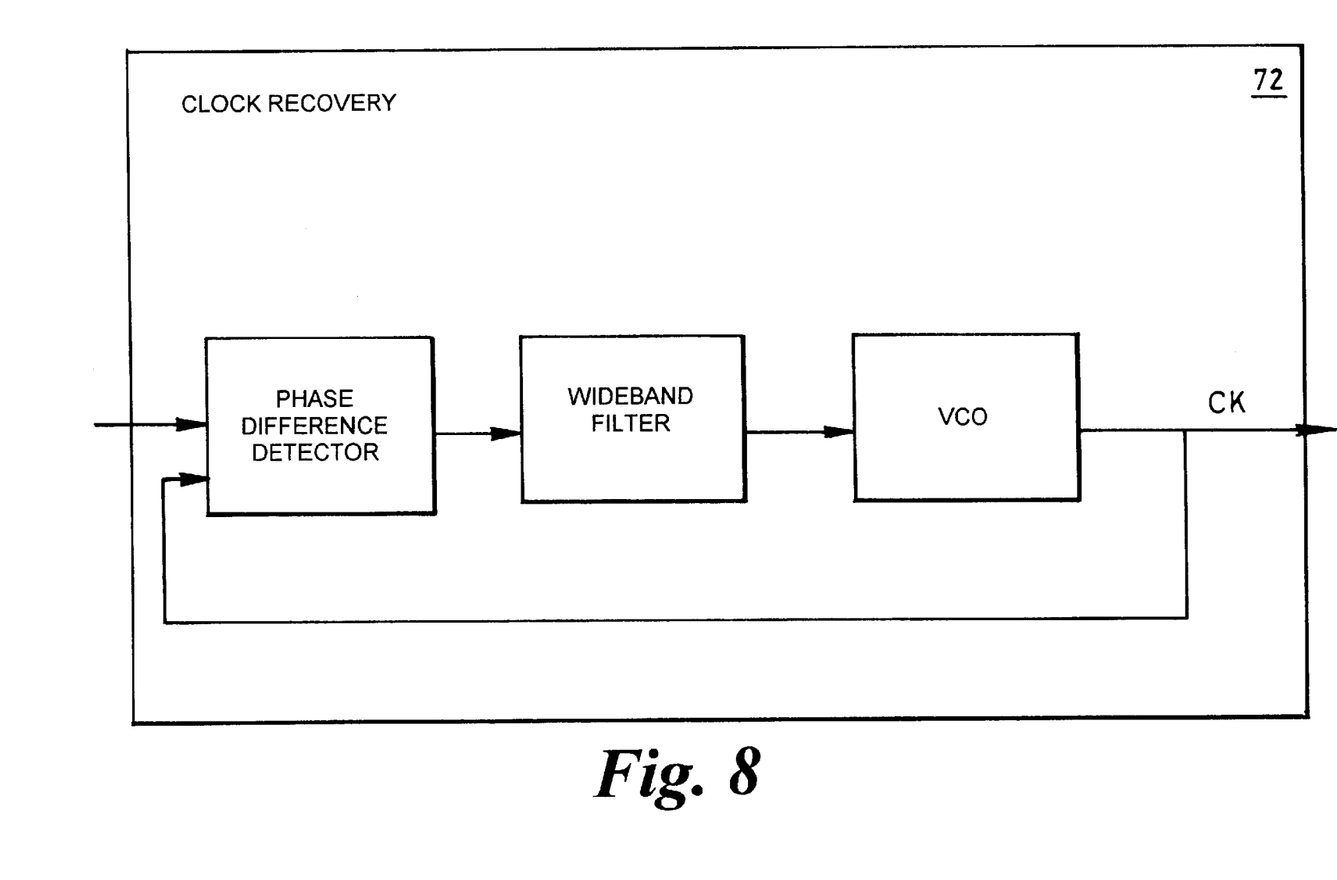
FIG. 8 shows a more detailed schematic diagram of the clock recovery circuit of FIG. 7.
Figure 9:
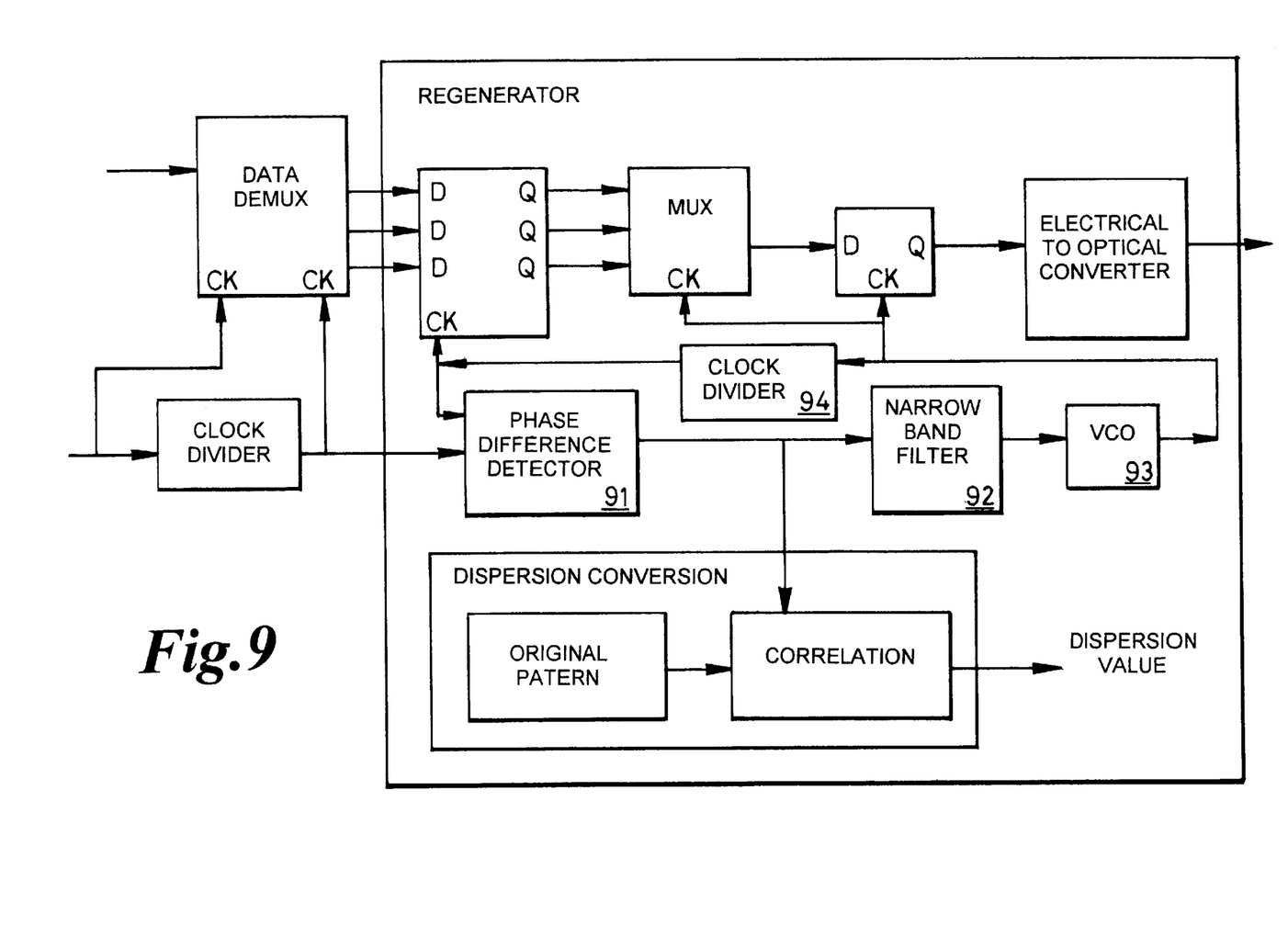
FIG. 9 shows a more detailed schematic diagram of the regenerator for use in the system of FIG. 2.
Figure 10:
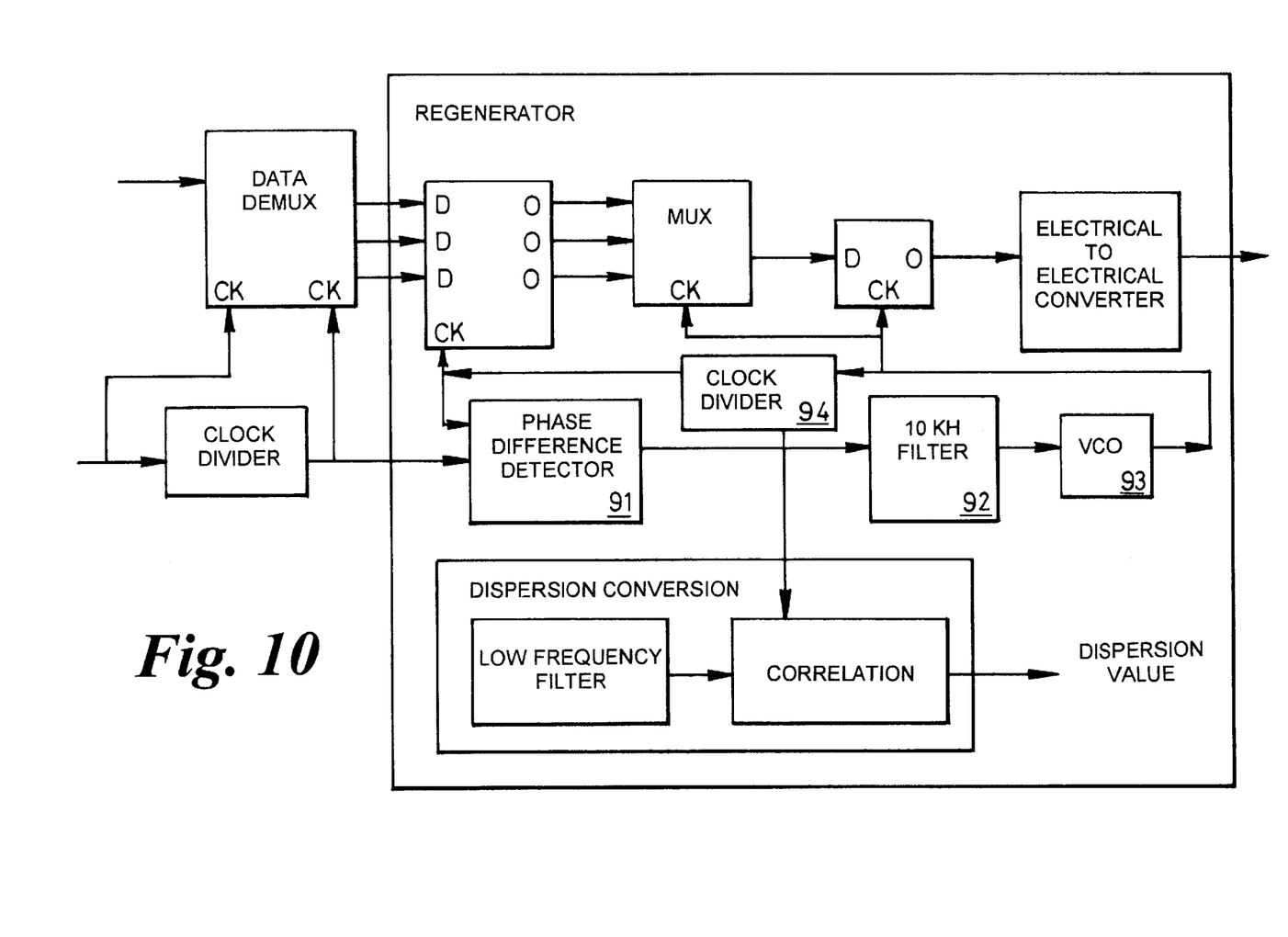
FIG. 10 shows a regenerator for use in the system of FIG. 2 including filtering means for deriving the low frequency content of the recovered data.

Various arrangements of the transmitter are shown in FIGS. 3, 4, 5 and 6. Details of the receiver are shown in FIGS. 7 and 8. Details of the regenerator and, parts of the dispersion measurement system are shown in FIGS. 9 and 10.

Three particular ways of achieving dispersion measurement are shown. Firstly the measurement system can take advantage of patterns in the normal data traffic. Secondly it may use predetermined patterns impressed on the data traffic (with reference to FIGS. 3 and 4). Thirdly it may use patterns impressed on the optical carrier (with reference to FIGS. 5 and 6).

Figure 3:
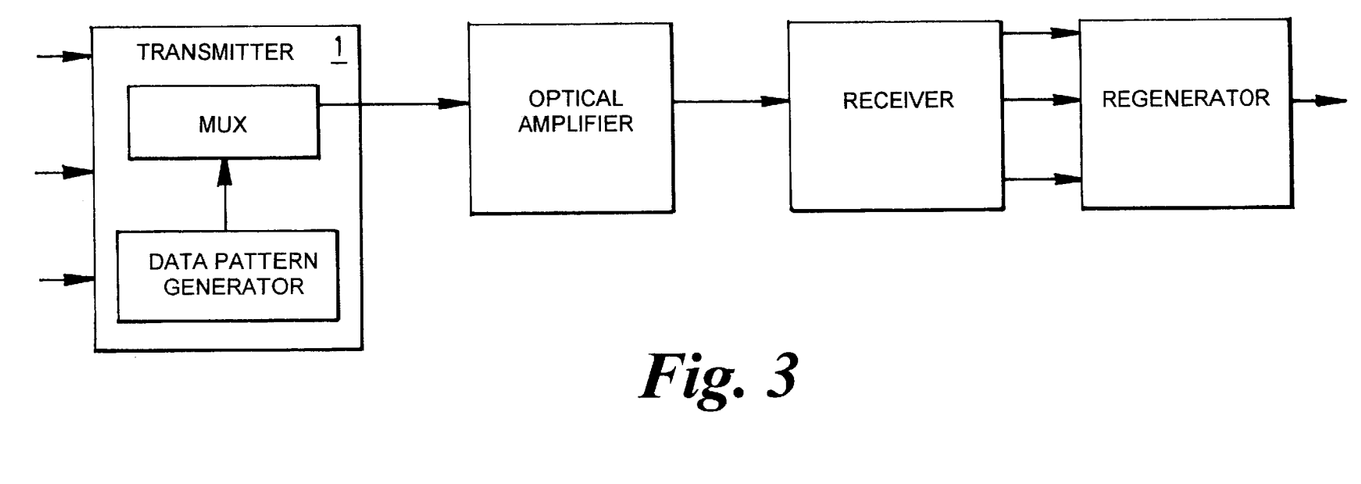
FIG. 3 shows system as in FIG. 2, and further including means for adding a predetermined data pattern.

FIG. 3 shows one possible arrangement of the transmitter 1 for use in the system of FIG. 2. A predetermined pattern is generated and fed to a data multiplexer for transmission together with other data traffic.

Figure 4:
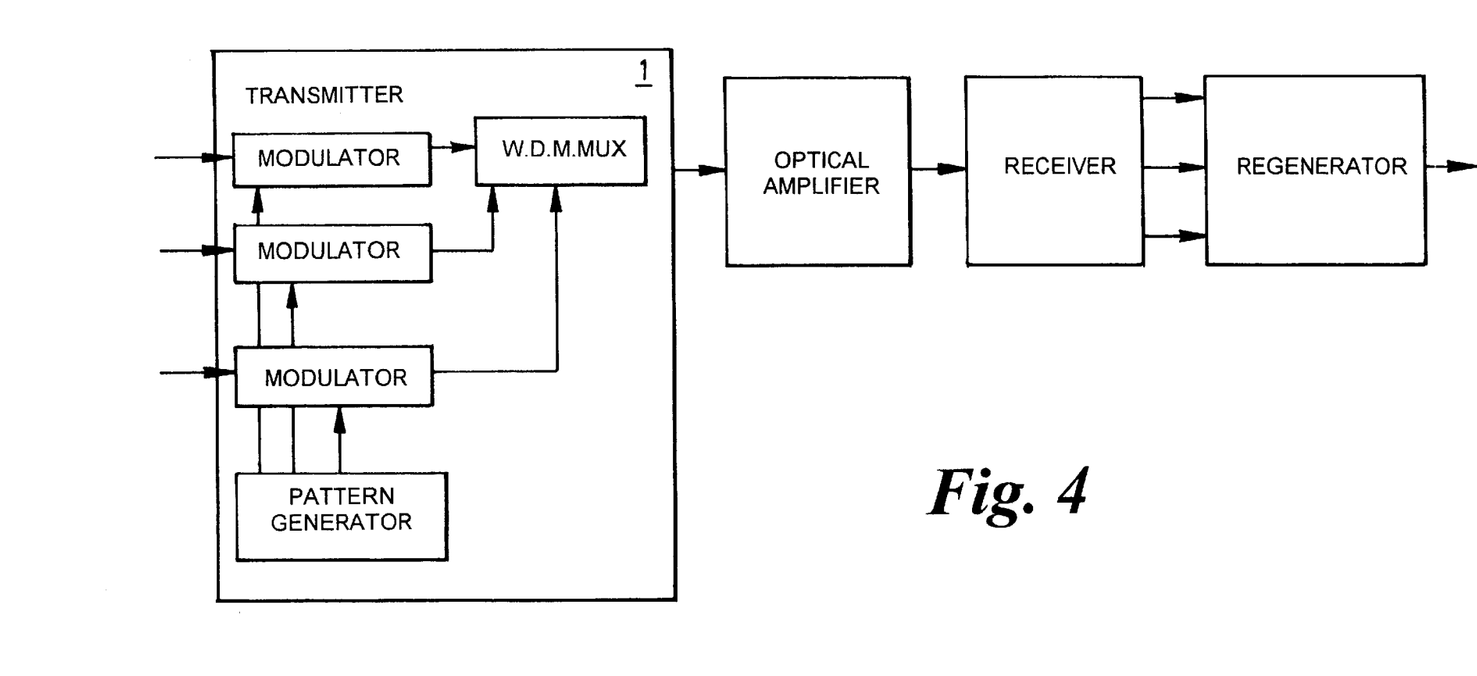
FIG. 4 shows a system as in FIG. 2 and including means for adding a predetermined pattern by modulating the data.

A variation is shown in FIG. 4. Here, the pattern generator output is used to modify one or more of the data channels prior to multiplexing. The modulators can be optical or be implemented in two stages; a digital electronic stage to impress the pattern on the data traffic, followed by an optical modulation stage. This enables processing to be carried out at lower data rates, and thus components are likely to be cheaper.

For a WDM system as shown in FIG. 4, it is advantageous to provide different patterns for the different channels. This enables the dispersion value to be ascertained at the different wavelengths used by the channels. If different patterns are used for each channel, these dispersion values can be obtained without needing to control or sequence the pattern generator. Measurement is facilitated if the patterns are orthogonal, so that they can be more easily distinguished at a subsequent correlation stage.

Figure 5:
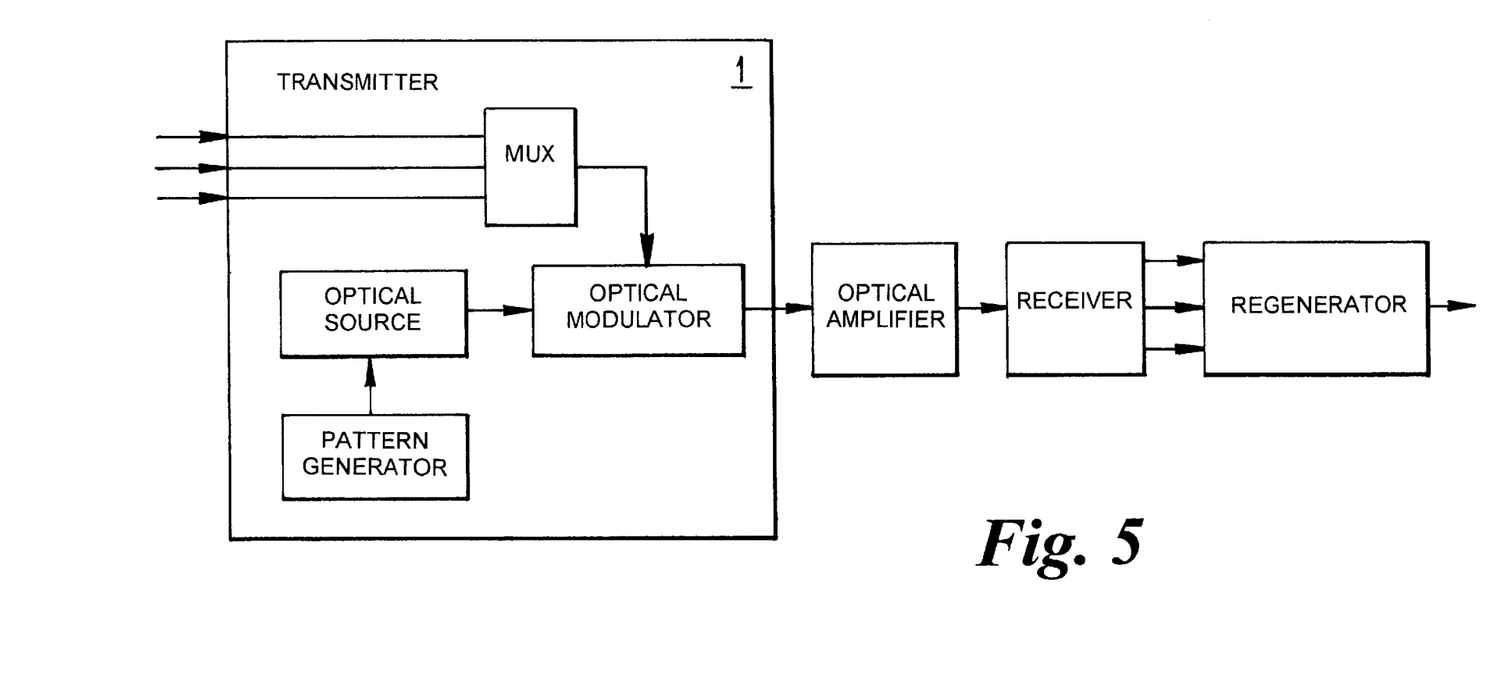
FIG. 5 shows a system as in FIG. 2, and including means for varying the wavelength of the optical signal.

If the patterns are phase independent orthogonal patterns, then the different patterns generated for each of the channels need not be in phase with each other. This makes for simpler construction of separate units at the transmitter. In FIG. 5 a further alternative transmitter 1 is shown for use in the system of FIG. 2. Here the pattern generator is used to modulate an optical carrier, which is subsequently externally modulated by the data traffic. Direct modulation by the data traffic of the optical source, usually a laser, is possible, but not usually used where high speeds are required. It would be possible to use external modulation for the pattern, either before or after the data traffic external modulation stage. Advantages of using direct modulation for the pattern include the reduced cost of the parts required, particularly where low frequencies are involved, and the amount of wavelength variation which can be achieved.

Figure 6:
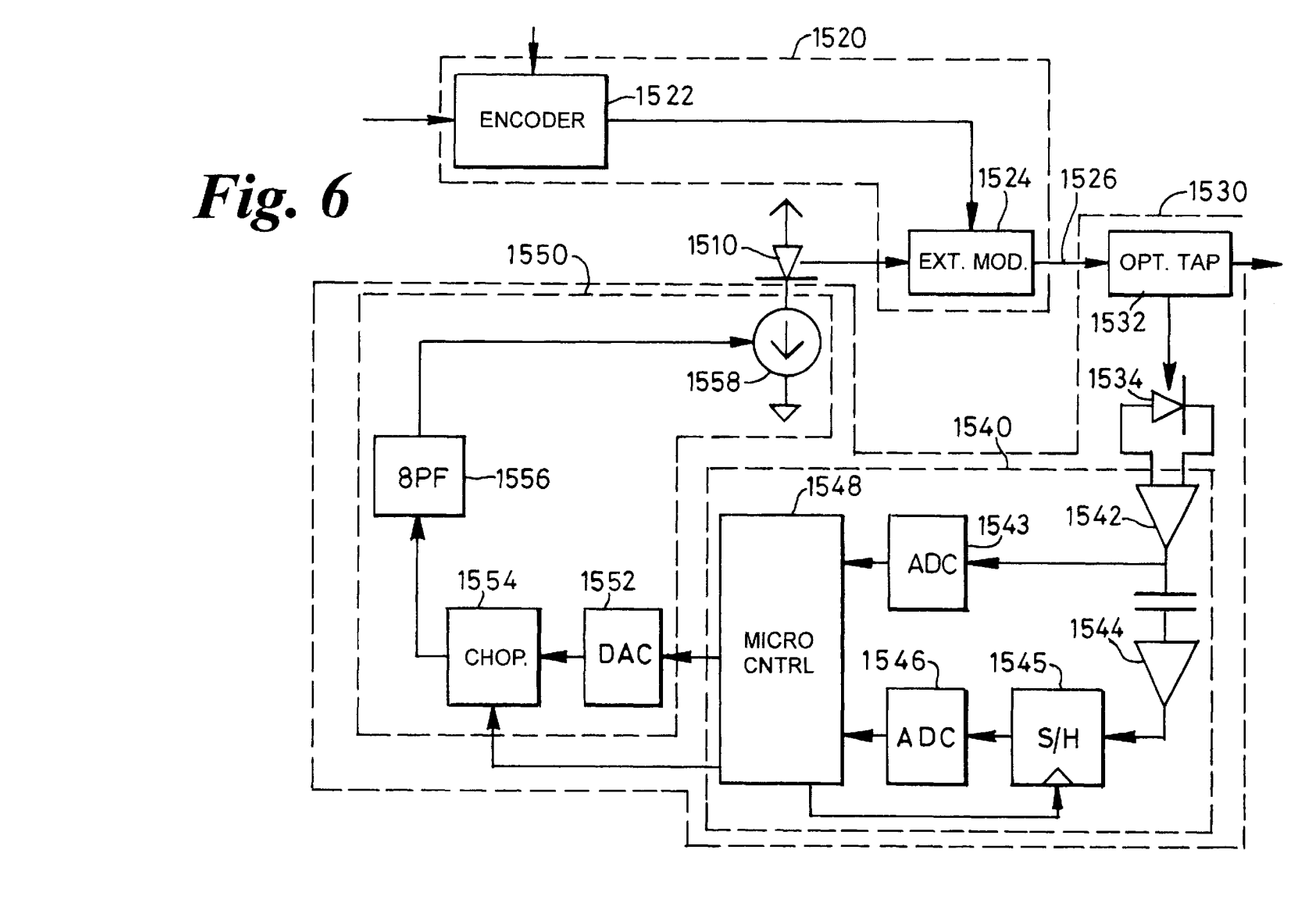
FIG. 6 shows a more detailed schematic diagram of the transmitter shown in FIG. 5.

FIG. 6 is a block schematic diagram of the optical transmitter of FIG. 5 for adding the predetermined pattern, in the form of a dither. The optical transmitter comprises an optical source in the form of a semiconductor laser 1510, a signal modulation arrangement 1520 in the form of a line encoder 1522 and an external optical modulator 1524, and a dither modulation arrangement 1530. The dither modulation arrangement 1530 comprises an optical tap 1532, an optoelectronic conversion device in the form of a PIN diode 1534, a calculation arrangement 1540, and a dither amplitude control arrangement 1550. The calculation arrangement 1540 comprises a transimpedance amplifier 1542, a first analog to digital converter 1543, an AC amplifier 1544, a sample and hold circuit 1545, a second analog to digital converter 1546, and a microcontroller 1548.

The dither amplitude control arrangement 1550 comprises a digital to analog converter 1552, a chopper 1554, a bandpass filter 1556 and a voltage controlled current source 1558.

The digital to analog converter 1552 applies an analog signal to a signal input of the chopper 1554, the analog signal having a signal level corresponding to a digital code supplied to the digital to analog converter 1552 by the microcontroller 1548. The microcontroller 1548 repeatedly applies a 64 bit Miller encoded pseudorandom sequence to a control input of the chopper 1554 to modulate the analog signal at 64 kbps. The modulated signal is filtered by the bandpass filter 1556 and applied to a control input of the voltage controlled current source 1558 to modulate a bias current of the semiconductor laser 1510. Consequently, the semiconductor laser 1510 emits an optical signal modulated by a 64 kbps low modulation index dither signal. This gives a dither with predominant frequency content between 20 and 40 kHz.

The dither modulated optical signal is applied to the external optical modulator 1524 which responds to a high speed (approximately 2.5 Gbps) electrical data signal supplied by the line encoder 1522 to superimpose a high speed, high modulation index data modulation on the dither modulation of the optical signal. The twice modulated optical signal is coupled to an output fibre 1526 of the optical transmitter 1500.

The optical tap 1532 couples approximately 3% of the modulated optical signal on the output fibre 1526 to the PIN diode 1534. The PIN diode 1534 converts the tapped optical signal to a photocurrent, and the transimpedance amplifier 1542 amplifies and converts the photocurrent to a voltage. The first analog to digital converter 1543 converts the analog voltage to digital code which estimates the total optical power of the tapped optical signal, and this digital code is supplied to the microcontroller 1548. The AC amplifier 1544 is AC coupled to the transimpedance amplifier 1542 and provides further amplification of an AC component of the voltage. The sample and hold circuit 1545 samples the amplified AC voltage. The second analog to digital converter 1546 converts the analog samples to digital codes which are supplied to the microcontroller 1548. The microcontroller 1548 correlates the digitally encoded AC signal with the pseudorandom sequence applied to the chopper 1554 to compute the amplitude of the dither modulation in the tapped optical signal, compares the dither modulation amplitude to the estimated total power of the tapped optical signal to compute the dither modulation depth, and adjusts the digital code applied to the digital to analog converter to fix the dither modulation depth at a known and precisely controlled value. The A.M to F.M. conversion characteristic of each particular laser is calibrated within the memory associated with the microcontroller, to improve the precision of the resulting F.M. The characteristic can be measured easily for any laser.

How to control the chirp parameter, or wavelength change property of the transmitter is shown for example in U.S. application Ser. No. 08-450841 by Rolland and Cartledge.

All the patterns and circuitry for generating the dither may be present for monitoring or altering other parameters of the system such as suppression of stimulated Brillouin scattering. An example of this is disclosed in U.S. Pat. No. 5,513,029 by Roberts and Habel. Thus the present invention can make use of such transmitters with little or no modification. Furthermore the same circuitry can be used for noise monitoring for example.

The pattern may be Miller encoded to help shape the spectral shape. It may be pseudorandom so as to minimise any correlation with other useful information in the transmitted signal, to avoid interference such as beating. The pattern may be asymmetric so as to enable the sign of dispersion to be determined, as will be explained below.

How the receiver side of the system extracts the patterns and derives the dispersion value will now be described.

To determine the dispersion in a length of the optical path, the signal at the end of this length is processed to determine the resulting jitter, caused by the data pattern induced wavelength variation, using the following equation:

$$\Delta t = D \cdot \Delta\lambda + k \cdot \Delta\lambda + \text{noise}$$

Where:
D is dispersion in picoseconds per nanometer for a given optical span and a given wavelength;
$\Delta\lambda$ is the R.M.S. change in wavelength caused by the data pattern;
$\Delta t$ is the R.M.S. jitter resulting from the effect of dispersion on the source wavelength variation;
k is a factor representing the jitter owing to AM to PM conversion in the receiver, of the AM portion of the source dither, mainly due to non linear phase response of amplifier stages in the receiver.

The amount of amplitude modulation at the transmitter side can be selected, to achieve a compromise between the requirements of accuracy of measurement, and minimizing undesired side effects such as jitter and eye closure. A larger amplitude can give better accuracy, but with worse side effects. In a 2.5 GB per second externally modulated system, 0.6% R.M.S. amplitude variation produced 700 MHz of frequency variation, though the precise relationship is laser dependent. The resulting jitter for a 100 km length of single mode fibre is in the order of 10 picoseconds. This represents one fortieth of the clock period, and so cannot easily be measured directly, but is obtainable using correlation techniques.

FIG. 7 shows a schematic diagram of a receiver (3) for use in the system of FIG. 2. It may serve as the end point of the link, or as a part of a repeater. It includes an optical to electrical converter (70) an amplification and filtering stage (71), a clock recovery stage (72), a threshold stage (73) and a retiming stage (74). The clock recovery stage is shown in more detail in FIG. 8. It is well known how to put each of these stages into practice, and so it is not necessary to describe particular circuits.

The outputs of the receiver include digital data signals and clock signals.

The clock signals may be divided down so as to reduce the clock rate. Correspondingly, the data signals may be demultiplexed or converted from serial to parallel format. Measures such as these, for slowing the clock rate, make the data signals easier and cheaper to process.

Means for measuring the dispersion in the optical path can be incorporated in the receiver, though this has not been illustrated. An optical tap at the input to the receiver could feed a small proportion, for example 5% of the signal to measurement circuitry (not shown). Such measurement circuitry could also use signals taken from any of the receiver stages shown in FIG. 7.

FIG. 8 shows a typical clock recovery circuit using a phase locked loop. An alternative possibility is to make use of a SAW filter (not shown). Again, in principle, the measurement of dispersion can us signals from various stages in the clock recovery circuit.

The bandwidth of the phase locked loop shown in FIG. 8 is typically 200 to 5000 times less than the bit rate of the data traffic. In a specific example of a 2.5 GB per second system, the clock recovery phase locked loop bandwidth might be 1 MHz. This is designed to enable it to track substantially all incoming jitter, so as not to degrade the B.E.R. This means it will pass the jitter caused by the predetermined pattern, without significant attenuation. This is in contrast with the phase locked loop of the regenerator, as will be described later.

FIGS. 9 and 10 show examples of regenerators, where the dispersion is derived from the recovered clock. The timing jitter is separated using a phase locked loop in the regenerator. A correlation means then converts this jitter into a dispersion value.

The two alternative regenerator circuits shown in FIGS. 9 and 10 differ only in that the dispersion conversion means shown in FIG. 9 uses an original pattern generator, while that of FIG. 10 derives the pattern from the recovered data.

In FIG. 9 a separate clock to that used by the receiver, is generated, and locked to the incoming clock from the receiver, using a phase locked loop. This loop comprises a phase difference detector 91, a narrow band filter 92, a voltage controlled oscillator (VCO) 93 and a clock divider 94.

Some of the timing jitter on the recovered clock fed into the regenerator notably the bulk of the jitter resulting from the pattern, will not pass through the phase locked loop, which typically has a 10 kHz low pass bandwidth. This is designed to be high enough for good acquisition behaviour, without passing on jitter. Therefore this portion of the timing jitter will appear as a phase difference between the clock output by the VCO, and the recovered clock input from the receiver. This difference is detected by the phase difference detector 91.

To obtain a value for dispersion, this timing jitter should be correlated with the original pattern to remove parts of the timing jitter caused by other parts of the transmitted signal, and noise. This will leave the timing jitter caused by the pattern, timing jitter caused by the phase response of circuitry between the optical path and the measurement means, (principally amplification stages) and some noise.

Particularly for higher bit rates, e.g. 2.5 GB per second, up to 10 or even 40 GB per second, the allowable range of dispersion becomes smaller, and thus the measurement of the dispersion must become more accurate.

If it is desired to determine not only when dispersion thresholds are exceeded in a particular part of the optical path, but also performance margins, or how close to the ends of the allowable dispersion range is a particular part of the optical path, then even greater accuracy of dispersion measurement is needed. Furthermore, control of dispersion compensators in particular, may require greater accuracy, particularly if they have complex responses, or narrow ranges of linear response.

For accurate timing measurements, using some form of correlation with a predetermined pattern of wavelength variation can give good results. The timing measurements are so small that noise is a significant factor, which needs to be filtered out. Furthermore, in the receiver, and anywhere between the optical path and the measurement means, distortions and noise may be introduced. Finally, the wavelength variations, and consequential timing jitter should be small enough to avoid interference with data traffic.

The cost of providing the high speed, high accuracy processing 5 necessary to make such a correlation can be reduced by incorporating the correlation means into a regenerator, as shown in FIG. 9 or FIG. 10. This is particularly so if the regenerator already includes digital signal processing circuitry.

Figure 11:
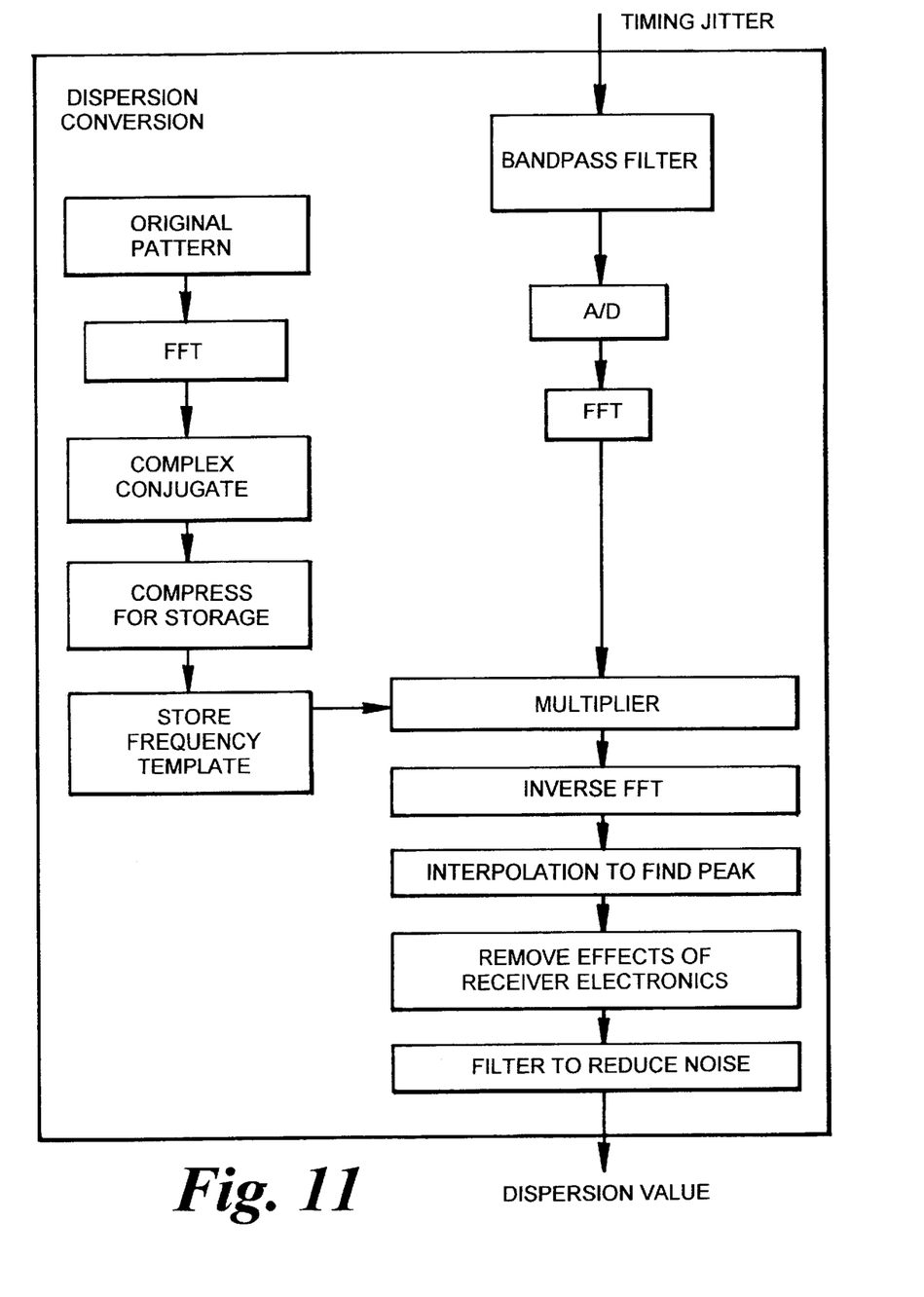
FIG. 11 shows a more detailed schematic diagram of the correlation function of FIG. 9.

A more detailed schematic diagram showing an example of the correlation to separate the desired part of the timing jitter is shown in FIG. 11.

FIG. 11 shows in functional terms various stages in converting the timing jitter in the form of a clock phase difference signal, into dispersion value. In practice, some or all of the stages could be implemented using a single chip digital signalling processor (DSP).

In principle the clock phase difference signal could be transmitted elsewhere, and the conversion process to obtain a dispersion value, could be carried out in some means provided elsewhere. This possibility is encompassed in the present invention. The disadvantage with such an arrangement is the additional hardware which may be required in transmitting the clock phase difference before converting it into a dispersion value. The additional hardware may be required because the clock phase difference signal would typically require a 200 K Byte per second transmission channel, well beyond the bandwidth of a currently available modem.

Nevertheless there may be advantages in carrying out the conversion elsewhere, such as at the transmitter, at a dispersion compensator, or at a central control or monitoring location, if this enables several DSP converters to be replaced by a single central processsor, handling the conversion for a plurality of measurement locations. This could enable a reduction in the total amount of hardware for example.

As shown in FIG. 11, the first stage is a bandpass filter, so as to restrict the signal to be processed, to only the frequencies of interest, according to the type of wavelength variation induced at the transmitter. After conversion to digital data, a fast Fourrier Transform (FFT) is carried out, to enable processing in the frequency domain. In principle, correlation can be carried out in the time domain, but frequency domain is usual.

A multiplication stage is then provided, to multiply the FFT output with a stored frequency template representing the pattern to which the timing jitter is being correlated. How this template is derived will be described later.

The result of the multiplication is put through an inverse FFT process to return to the time domain. A series of complex samples is output, ready for interpolation. Interpolation improves accuracy, but may not be necessary depending on the number of samples and the accuracy required.

The interpolation stage involves interpolating between complex samples to determine a peak correlation. This can be implemented in various ways. Many algorithms have been developed, particularly for radar use. Which of these well known methods will give best results depends on the particular system characteristics, in particular on the amount of noise, the number of samples relative to the pattern, the shape of the auto correlation of the pattern, the desired accuracy, available computing power, and desired speed of obtaining a result. Also, the determination of sign of the dispersion affects the interpolation as described below.

To find the sign of the dispersion, an asymmetric pattern must be used if phase invariant detection is used, as described above. The peak detection needs to find the largest absolute value and report the corresponding signed value, which gives the sign of the dispersion.

Next, there is a compensation stage to remove the effects of phase variations caused by circuitry in the receiver and other intervening stages, principally any amplifier stages, which will have a notable phase response curve as amplitude varies, known as AM to PM conversion.

These effects can be determined by calibration at or before installation, and a correction factor stored, for use each time a conversion is made.

Finally, a noise reduction filter may be employed before or after the receiver circuitry compensation, to reduce noise not removed by the correlation process.

Generating the frequency template for the above correlation process may be carried out based on an original predetermined pattern as shown in FIG. 11, or may be based on data patterns extracted from the transmitted data, as indicated in FIG. 10. The former technique has the advantages of enabling preprocessing and not using up transmission bandwidth. Also, it does not require demultiplexing of data which may involve additional hardware.

In either case, the pattern is converted into the frequency domain by an FFT, then the complex conjugate is derived, to prepare for the multiplication. Compression for storage may then be necessary. It is then ready as a template for multiplying with successive frequency domain representations of the clock phase difference.

The amplitude of the part of the timing jitter which correlates to the impressed pattern will be directly proportional to the dispersion, subject to the effects of receiver electronics, and noise.

In principle the timing jitter which is measured and converted, could be derived from the data rather than the recovered clock. An original impressed data pattern could be correlated with this measured data timing jitter. It would also be conceivable to measure and use the timing jitter caused not by any impressed data pattern, but by the normal data traffic.

The pattern for the correlation template would need to be extracted from this normal data traffic as shown in FIG. 10. For such an embodiment, the timing jitter could be measured either from the recovered clock, as shown in FIG. 10, or from the data (not shown).

This would enable the measurements to be taken without requiring additional hardware at a transmitter side, thus retrofitting in particular is facilitated. Furthermore, there would be no danger of interference, or bandwidth reduction if no special pattern is transmitted. However, the generation of the template may require considerably greater processing resources, and the correlation may be less accurate if for example it relies on extracting a particular band of low frequencies (to facilitate the correlation) and there happened to be little response in those frequencies at a given time. These drawbacks may reduce with time as processing power becomes less expensive.

Other variations will be apparent to a skilled reader which fall within the spirit and scope of the claims. The invention is not limited to examples described.

What is claimed is:

1. An optical transmission system for transmitting data along an optical path, the transmission system comprising: a controllable element; means for determining the chromatic dispersion of at least part of the optical path; and means for controlling the element in the transmission system in dependence on the determined chromatic dispersion value.

2. The transmission system of claim 1 wherein the means for determining the chromatic dispersion is at least partially incorporated into the element or another element of the transmission system.

3. The transmission system of claim 1 wherein the controllable element comprises a dispersion compensating means, or a transmitter.

4. The transmission system of claim 1 wherein the controllable element comprises a monitoring means for comparing the dispersion value to a threshold.

5. The transmission system of claim 4 wherein the monitoring means is arranged to alter data traffic on the optical path if the threshold is exceeded.

6. A control system for a controllable element of an optical transmission system, comprising means for determining the chromatic dispersion of at least a part of an optical path of the transmission system, and means for controlling the controllable element of the optical transmission system, wherein the control means is operable in dependence on the determined optical dispersion value.

7. The control system of claim 6 wherein the means for determining the chromatic dispersion comprises at least a portion of an element of the transmission system for receiving or processing a signal passed along the optical path.

8. The control system of claim 6 wherein the dispersion determining means comprises means for determining timing jitter in the signal after passage along the part of the optical path being measured, and means for deriving a dispersion value from the timing jitter.

9. The control system of claim 8 wherein the means for deriving a dispersion value comprises means for correlating the timing jitter with at least a portion of the transmitted signal.

10. The control system of claim 9 wherein the dispersion determining means comprises means for impressing a pattern on the transmitted signal, and the correlating means correlates the timing jitter with this pattern.

11. The control system of claim 10 wherein the means for impressing a pattern comprises means for applying low frequency dither signal to an optical transmitter to suppress stimulated Brillouin scattering.

12. The control system of claim 10 wherein the means for impressing a pattern is arranged to impress an asymmetric pattern and the correlating means is arranged to determine the sign of the dispersion value.

13. A transmission system comprising the control system of claim 6.

14. A dispersion measurement system for measuring the optical dispersion of at least part of the optical path of an optical transmission system for transmitting data, the measurement system comprising at least a portion of an element of the transmission system for receiving or processing a data signal passed along the optical path and circuitry at least partially integrated into the transmission system, for deriving dispersion from the data signal received.

15. The measurement system of claim 14 comprising means for measuring the timing jitter in the signal after passage along the part of the optical path being measured.

16. The measurement system of claim 15 wherein the element comprises a receiver, and the receiver comprises a means for recovering a clock from the signal, wherein the timing jitter is derived from the recovered clock.

17. The measurement system of claim 15 wherein the element comprises a receiver and a regenerator, the regenerator comprising a phase locked loop locked to the recovered clock output by the receiver, wherein the timing jitter is derived by obtaining the phase difference between the recovered clock and the output of the phase locked loop.

18. The measurement system of claim 17 comprising means for deriving a dispersion value from the timing jitter.

19. The measurement system of claim 14 comprising means for applying a variation in wavelength to the signal in the form of a predetermined pattern, before the signal passes along the part of the optical path to be measured.

20. The measurement system of claim 19 wherein the means for applying the wavelength variation is also arranged to monitor or alter other parameters of the transmission system.

21. The measurement system of claim 20 wherein the wavelength variation is a low frequency dither signal for suppressing stimulated Brillouin scattering.

22. The measurement system of claim 19 comprising means for correlating between measured timing jitter and the predetermined pattern.

23. The measurement system of claim 22 wherein the pattern is asymmetric and the system comprises means for determining the sign of dispersion.

24. The measurement system of claim 19 wherein the pattern is pseudo random.

25. The measurement system of claim 19 for use with a wavelength division multiplexed transmission system comprising a plurality of wavelength multiplexed channels, wherein said applying means is arranged to apply different predetermined patterns of variation of wavelength to the different channels.

26. A transmission system comprising the measurement system of claim 14.

27. The measurement system of claim 14, wherein the transmission system is arranged to carry many channels on the optical path, and the measurement system is arranged to measure dispersion of one or more of the channels while others of the channels are able to transmit other data traffic.

28. The measurement system of claim 27, arranged to transmit a test pattern over the one or more channels, and measure timing jitter to determine dispersion.

29. An chromatic dispersion measurement system for measuring the optical dispersion in at least part of an optical path in an optical transmission system, comprising means for detecting jitter in a signal after transmission, and means for correlating the detected jitter with a pattern in the transmitted signal.

30. A method of transmitting data along an optical path in an optical transmission system, comprising the step of determining the optical dispersion in at least part of the optical path at the same time as the data is being transmitted, and the step of using the determined dispersion value for monitoring whether it exceeds a threshold or for controlling data flow, or for controlling a dispersion compensating device or method.

31. An optical transmission system for transmitting data along an optical path, the transmission system comprising:
a controllable element;
circuitry for determining the chromatic dispersion of at least part of the optical path; and
circuitry for controlling the element in the transmission system in dependence on the determined chromatic dispersion value.

32. A method of measuring optical dispersion in an optical transmission system, comprising the step of receiving a data signal carried over at last part of the optical path using at least a portion of an element of the transmission system for receiving or processing the data signal, and using circuitry at least partially integrated into the element, to derive the dispersion from the received data signal.

33. An element for receiving, or processing a signal in an optical transmission system, comprising means for detecting jitter in the signal after transmission and means for correlating the detected jitter with a pattern in the transmitted signal.

34. An optical dispersion measurement system for measuring the optical dispersion in part of an optical transmission system, the measurement system comprising circuitry arranged to receive a signal transmitted along that part, and circuitry arranged to derive the dispersion from the signal, the measurement system being capable of operating while data traffic is present on that part of the transmission system.

* * * * *